(12) United States Patent  
Knoll

(10) Patent No.: US 7,213,769 B2
(45) Date of Patent: May 8, 2007

(54) SMART CARD

(75) Inventor: Bernhard Theo Knoll, Neubiberg (DE)

(73) Assignee: Infineon Technologies AG (DE)

( * ) Notice: Subject to any disclaimer, the term of this patent is extended or adjusted under 35 U.S.C. 154(b) by 185 days.

(21) Appl. No.: 11/121,689

(22) Filed: May 3, 2005

(65) Prior Publication Data

US 2006/0131429 A1    Jun. 22, 2006

(30) Foreign Application Priority Data

May 4, 2004    (DE) .................. 10 2004 021 872

(51) Int. Cl.
*G06K 19/06* (2006.01)
(52) U.S. Cl. ............. 235/492; 235/451; 235/493
(58) Field of Classification Search ........... 235/441, 235/444, 446, 453, 476, 493
See application file for complete search history.

(56) References Cited

U.S. PATENT DOCUMENTS

| | | |
|---|---|---|
| 6,259,035 B1 | 7/2001 | Truggelmann et al. |
| 6,370,029 B1 | 4/2002 | Kawan |
| 6,378,774 B1 * | 4/2002 | Emori et al. ............. 235/492 |

FOREIGN PATENT DOCUMENTS

| | | |
|---|---|---|
| DE | 199 27 051 A1 | 12/2000 |
| DE | 100 35 45 A1 | 2/2002 |
| DE | 101 27 221 A1 | 11/2002 |
| EP | 0 974 928 A2 | 1/2000 |
| FR | 2 695 234 A1 | 3/1994 |

OTHER PUBLICATIONS

Coyle, S et al.; "Confined Plasmons in Metallic Nanocavities"; Physical Review Letters; vol. 87, No. 17; Oct. 22, 2001: 176801-1 to 176801-4.

* cited by examiner

*Primary Examiner*—Seung Ho Lee
(74) *Attorney, Agent, or Firm*—Dickstein, Shapiro, LLP.

(57) ABSTRACT

A smart card having a support element, at least one electrically conductive contact-making element in a surface area of the support element, and at least one electrical circuit, which is on and/or in the support element, and is coupled to the at least one electrically conductive contact-making element. Microstructures and/or nanostructures are incorporated in the at least one electrically conductive contact-making element, of such a size that the microstructures and/or nanostructures absorb electromagnetic radiation at at least one wavelength.

22 Claims, 2 Drawing Sheets

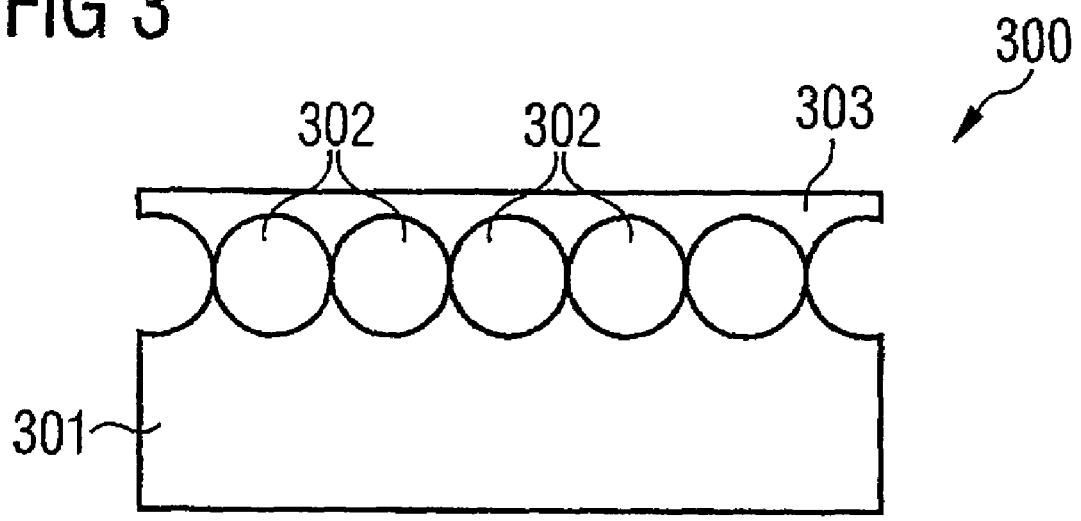
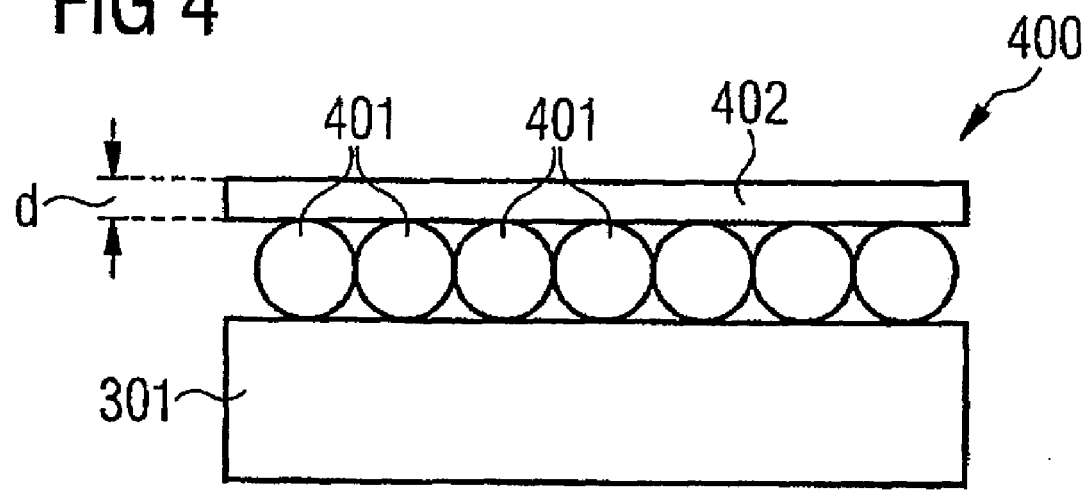

SMART CARD

CROSS-REFERENCE TO RELATED APPLICATION

This application claims priority to German Patent Application Serial No. 10 2004 021 872.2-53, which was filed on May 4, 2004.

FIELD OF THE INVENTION

The invention relates to a smart card, to a method for production of a smart card, and to an electrically conductive contact-making element.

BACKGROUND OF THE INVENTION

After the introduction of magnetic strip cards, attempts were made to find a new way to overcome the disadvantages of magnetic strip cards. A smart card is one such improved storage medium, which has sufficiently large and long-life storage capabilities. The use of integrated storage media with a high storage capacity and integrated security logic in a smart card in consequence represents a significant improvement over magnetic strip cards.

Fields of application for smart cards are, for example, telephone smart cards, GSM cards ("Global System for Mobile Communication"), medical insurance cards as well as smart cards as identification verification (for example prepaid cards).

A smart card contains a mount element (for example composed of plastic) in which an integrated circuit is provided in an electronic chip, thus providing the actual functionality of the smart card. According to the prior art, external contact is made with a smart card using gold pads with which a reader can make contact, for example by means of read contacts, thus allowing them to be electrically driven.

According to the prior art, gold pads are used as contact surfaces whose color is permanently predetermined by the material (to be precise gold) in smart card products.

However, smart card products that are known from the prior art have the disadvantage that the color of the contact-making elements must be gold. Another disadvantage of smart card products which are known from the prior art is that the security of such smart card products is frequently not sufficiently good, so that smart cards according to the prior art are not sufficiently resistant to falsification.

Coyle, S. et al. (2001) "Confined Plasmons in Metallic Nanocavities" Physical Review Letters 87(17): 176801-1 to 176801-4 discloses the excitation of plasmons in metallic nanocavities.

SUMMARY OF THE INVENTION

In particular, the invention is based on the problem of providing an electrically conductive contact-making element and a smart card having such an electrically conductive contact-making element and which is more resistant to falsification.

The problem is solved by a smart card, by a method for production of a smart card, and by an electrically conductive contact-making element having the features according to the independent patent claims.

The smart card according to the invention contains a supporting element, at least one electrically conductive contact-making element in a surface area of the supporting element, and at least one electrical circuit on and/or in the mount element, which is coupled to the at least one electrically conductive contact-making element. Microstructures and/or nanostructures are incorporated in the at least one electrically conductive contact-making element, of such a size that the microstructures and/or nanostructures absorb electromagnetic radiation at at least one wavelength.

In the method according to the invention for production of a smart card, at least one electrically conductive contact-making element is formed in a surface area of a supporting element, and at least one electrical circuit is formed on and/or in the supporting element, and is coupled to the at least one electrically conductive contact-making element. Furthermore, microstructures and/or nanostructures are incorporated in the at least one electrically conductive contact-making element, of such a size that the microstructures and/or nanostructures absorb electromagnetic radiation at at least one wavelength.

BRIEF DESCRIPTION OF THE DRAWINGS

Exemplary embodiments of the invention will be explained in more detail in the following text and are illustrated in the figures, in which:

FIG. 3 shows a cross-section view through an electrically conductive contact-making element according to a first exemplary embodiment of the invention, and FIG. 4 shows a cross-section view through an electrically conductive contact-making element according to a second exemplary embodiment of the invention.

Identical or similar components are provided with the same reference numbers in the various figures.

Figure 1:
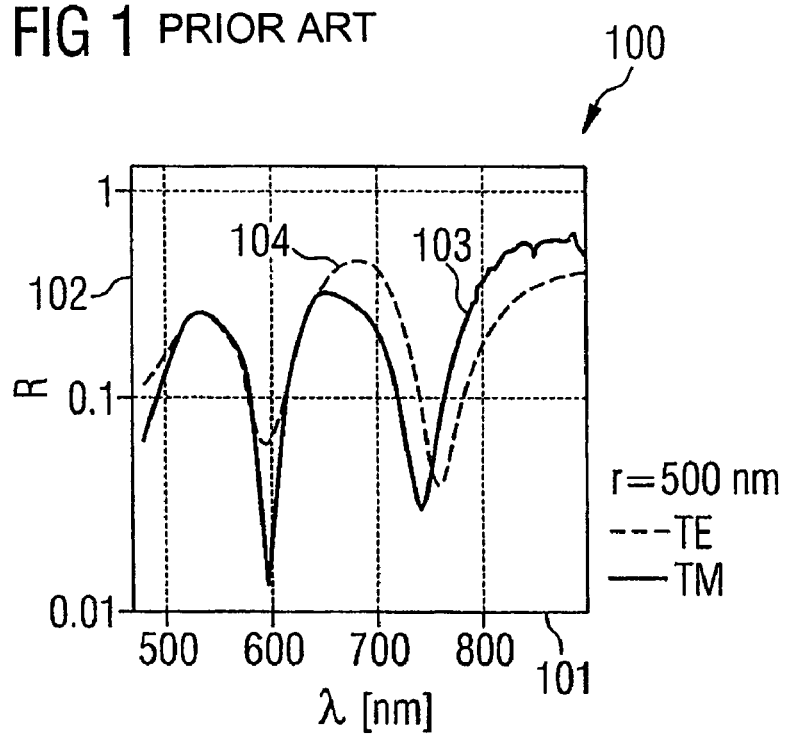
FIG. 1 shows a graph illustrating the reflectivity of an electrically conductive element with microstructures and/or nanostructures as a function of the wavelength of the illuminating radiation.

The illustrations in the figures are schematic, and are not to scale.

DETAILED DESCRIPTION OF PREFERRED EMBODIMENTS OF THE INVENTION

One fundamental idea of the invention is to incorporate microstructures and/or nanostructures (that is to say bodies and/or cavities, with the latter being filled as required with dielectric material, and with dimensions in the range from nanometers to micrometers) in an electrically conductive contact-making element. Microstructures and/or nanostructures such as these (also referred to in the following text as micro-nanostructures) have the characteristic that they can absorb electromagnetic radiation in specific wavelength ranges in a characteristic manner. This is theoretically due to the fact that plasmons can be excited in electrically conductive micro-nanostructures such as these, see Coyle, S. et al.

The characteristic properties with regard to the absorption of electromagnetic radiation, which depends on the material and the sizes as well as the geometry of the micro-nanostructures, mean that the electrically conductive contact-making element may have virtually any desired color or else a number of different colors, which differ from the conventional gold color of gold pads on smart cards according to the prior art, by adjustment of the parameters that have been mentioned. It is thus possible to produce single-color or multi-color electrically conductive contact-making elements, which on the one hand satisfy customer demand for electrically conductive pads, for example for smart cards, to have a color other than gold, or to be multicolored.

As a result of the capability to provide different surface areas of the electrically conductive contact-making element with the micro-nanostructures in a different manner (that is to say, for example, different lateral structuring, different size and/or shape of the micro-nanostructures, different material, etc), the invention makes it possible to apply any desired images (for example company logos etc.) to the pads.

Furthermore, the characteristic electromagnetic absorption/reflection spectrum of the electrically conductive contact-making elements with the micro-nanostructures can be used as an (additional) security component as is of major importance particularly for use in a smart card.

The correctness of the electrically conductive contact-making element or of a smart card with such an electrically conductive contact-making element can be checked by scanning the absorption and/or reflection spectrum of an electrically conductive contact-making element such as this. Only one exciting electromagnetic radiation source (for example a laser, LED, small lamp, etc.) is required for this purpose, which produces electromagnetic radiation (in particular visible light, infrared radiation and ultraviolet radiation) at one wavelength, at two or more discrete wavelengths or over a cohesive wavelength range, with the radiation striking the electrically conductive contact-making element according to the invention. Furthermore, electromagnetic radiation which has been reflected from the electrically conductive contact-making element according to the invention can be detected by a detector for detection of electromagnetic radiation (for example a spectrometer), with a reflection spectrum thus being recorded on the basis of which the correctness of the electrically conductive contact-making elements according to the invention, or of a smart card, can be determined. The correctness/incorrectness of a smart card can thus be confirmed easily, quickly and reliably.

In one embodiment of the micro-nanostructures, in which these structures have their absorption line and/or absorption bands outside the visible range, this results in an "invisible" security feature thus additionally improving the resistance of a smart card to falsification.

The invention therefore provides colored contacts with a low electrical contact resistance, since the contact-making elements are themselves electrically conductive. Apart from the security and color aspects, the electrically conductive contact-making elements can thus be used as low-resistance contact connections, and are thus suitable for many applications in the field of electronics.

In particular, the smart card according to the invention and the electrically conductive contact-making elements contained on it can be produced using a gold surface, with electrically non-conductive nanoballs (for example small dielectric balls with a diameter of about 100 nanometers or less) directly underneath their surface. A structure such as this produces unique signatures in the visible spectrum. When illuminated with white light, they produce different colors, and the spectral characteristics can be determined by the size of the small dielectric balls (for example small latex balls). If, by way of example, a spectrometer is used to measure the reflected light as a function of the wavelength (or for measuring specific, discrete predetermined wavelengths), the correctness or incorrectness of a system such as this can be verified using simple means.

If, for example, the small balls have lateral structuring, a pattern (image, logo, etc.) can additionally also be produced.

In addition, a number of different colors are possible by using small balls with laterally different sizes.

The invention is used to identify and make use of the fact that, when an electrically conductive contact-making element having micro-nanostructures is provided, resonances (plasmons) which can be excited by means of illumination with light lead to an electrically conductive contact-making element which has a very characteristic visual reflection spectrum and/or absorption spectrum.

It is known from Coyle, S. et al. that resonances can be excited by means of light in the visible range on small metallic particles with dimensions in the region of 100 nanometers or less. This phenomenon, which is referred to as "Frohlich resonances" or "plasmons of small particles", is theoretically considered as collective excitation of the electrons in the metal particles. The precise position of a resonance in an optical spectrum is governed in particular by the dielectric constant of the metal and of the surrounding medium (for example air), and by the size of the particles.

A physically analogous structure is obtained with the inverse geometry, by embedding small vacuum balls or small dielectric balls in an electrically conductive matrix, (for example composed of metal). These are then referred to as resonant holes (are also referred to as microcavities or nanocavities). The holes in the electrically conductive material may also be filled with dielectric material, which is particularly advantageous for use as an electrically conductive contact-making element, in particular in a smart card, for reasons of mechanical robustness.

The micro-nanostructures should not be arranged too far underneath the surface of the electrically conductive contact-making element since, otherwise, the interaction with the light illuminating it can not always be adequately ensured (particularly as a result of light being reflected by the surface material).

An electrically conductive contact-making element can be produced, for example, by gold surfaces to which small latex balls (which are commercially available) have been added being covered by sputtering or vapor-deposition with gold material. Particularly good results can be achieved using an electrochemical deposition method after the adsorption of the small balls on the gold surface. The small latex balls can be selectively removed, or may remain in the electrically conductive contact-making element.

The method for production of an electrically conductive contact-making element such as this is simple and can be carried out without much technical effort or financial cost, so that it is possible to manufacture low-cost electrically conductive contact-making elements. The space between the small balls offers sufficient space for adequate electrical conductivity when making contact with the pads. The points with which contact is to be made can be designed to have a reduced ball density.

The electrically conductive contact-making element according to the invention may also have micro-nanocavities (that is to say holes with air or a dielectric solid body embedded in electrically conductive material) in a first surface area, and micro-nanobodies (that is to say electrically conductive bodies which are arranged at a predeterminable distance from one another) in a second surface area.

Preferred developments of the invention are described in the dependent claims.

The microstructures and/or nanostructures can be produced by means of an electrically conductive layer with microcavities and/or nanocavities incorporated in it.

Such microcavities or nanocavities in an electrically conductive layer may be either vacuum cavities or cavities filled with air, or else cavities with a dielectric filling (for example small latex balls).

According to the described embodiment, the microcavities and/or nanocavities may be formed in the electrically conductive layer, in particular being formed at a distance of at most 10 nanometers from the surface.

A configuration such as this ensures that electromagnetic radiation can also pass through the surface area of the layer and can penetrate to the microcavities and/or nanocavities in order to produce a characteristic absorption or reflection spectrum.

The microcavities and/or nanocavities may be filled with dielectric material, in particular with latex material or with air.

Alternatively or additionally, the microstructures and/or nanostructures may be formed by a layer composed of electrically conductive microbodies and/or nanobodies.

This embodiment may be regarded as the complementary embodiment to the embodiment described above of the microstructures and/or nanostructures as microcavities and/or nanocavities.

The excitation of plasmons, which leads to the characteristic electrical emission spectrum, can thus also be achieved by the microstructures and/or nanostructures being electrically conductive microbodies and/or nanobodies. These microbodies and/or nanobodies may be solid bodies (for example spherical) which are composed of an electrically conductive material. The microbodies and/or nanobodies may be adjacent to one another, in order to create a continuous electrically conductive connecting structure.

Furthermore, an electrically conductive thin layer can be provided on the layer composed of the microbodies and/or nanobodies. An electrically conductive thin layer such as this, which may be formed by way of example from gold material or from ITO material (indium tin oxide), allows a continuous electrically conductive and optically sufficiently highly translucent layer to be created even in a scenario in which the microbodies and/or nanobodies are not directly adjacent to one another, and thus do not create a continuous electrically conductive connection. In other words, the contact-making element can be provided with an electrically conductive characteristic by means of the thin film which is formed above the microbodies and/or nanobodies.

This thin layer may be so thin that a significant proportion of electromagnetic radiation can pass through it. If visible light is used, a thin layer that is formed from gold material should have a thickness of at most 10 nanometers, although the thickness may be greater if the thin layer is formed from (optically transparent) ITO material.

Indium tin oxide (ITO) is particularly highly suitable for use as the material for the electrically conductive thin layer since this material is electrically conductive and optically translucent. Alternatives for the electrically conductive thin layer are silver, gold, platinum, copper and/or silicon.

The microstructures and/or nanostructures may have dimensions in the range from nanometers to micrometers. In particular, the microstructures and/or nanostructures may have a size in the range from 10 nanometers to one micrometer.

The microstructures and/or nanostructures may, for example, be spherical, ellipsoid or cuboid. The characteristics of the optical reflection and/or emission spectrum can also be varied by varying the size of the micro-nanostructures.

The microstructures and/or nanostructures may be arranged periodically. In this case by way of example, the distance between adjacent particles may be approximately in the same order of magnitude as the diameter of a particle such as this.

Furthermore, the microstructures and/or nanostructures may be formed using a metal and/or a semiconductor. In particular, the microstructures and/or nanostructures may be formed using silver, gold, platinum and/or silicon.

The choice of the material for the microstructures and/or nanostructures obviously influences the physical parameters of the plasmons which can be excited in the micro-nanostructures, and thus the wavelengths of electromagnetic radiation which are absorbed.

The microstructures and/or nanostructures are preferably of such a size that they absorb electromagnetic radiation in the visible range and/or in the infrared range.

Furthermore, the microstructures and/or the nanostructures may be of such a size that they produce a visually visible image in the presence of electromagnetic radiation in the visible range.

A visually visible or perceptible image such as this may, for example, be a company logo or some other image, thus providing the smart card and/or the electrically conductive contact-making element with a desired, predeterminable aesthetic appearance.

The microstructures and/or nanostructures in the smart card may be dimensioned and/or arranged such that they have at least one visually perceptible color in the presence of electromagnetic radiation in the visible range.

The wavelength or the wavelengths at which the micro-nanostructures absorb electromagnetic radiation can be set by adjusting the parameters of the microstructures or nanostructures (material, shape, form and size). This has a direct influence on the visually perceptible color of the electrically conductive contact-making element or of the smart card.

The embodiments of the smart card also apply to the electrically conductive contact-making element, and vice versa.

The method according to the invention for production of the smart card according to the invention will be described in more detail in the following text. Embodiments of the smart card also apply to the method for production of the smart card, and vice versa.

In the production method, the microstructures and/or nanostructures may be formed by means of an electrically conductive layer with microcavities and/or nanocavities incorporated in it. In particular, according to this embodiment, the microcavities and/or nanocavities may be formed by first of all forming dielectric microstructures and/or nanostructures, and then by covering the dielectric microstructures and/or nanostructures with electrically conductive material.

Alternatively, the microstructures and/or nanostructures may be formed by deposition of a layer composed of electrically conductive microbodies.

With reference to FIG. 1, a graph 100 will be described in the following text, which illustrates a physical phenomenon which has been identified and made use of in order to form the electrically conductive contact-making element according to the invention.

The graph 100 in FIG. 1 shows an optical reflection spectrum, as has been published in Coyle, S. et al., of an electrically conductive element with microstructures and/or nanostructures. The wavelength λ of electromagnetic radiation is plotted (in nanometers) along the abscissa 101 in the graph 100. The reflectivity R is plotted (non-dimensionally)

along the ordinate 102, on a logarithmic scale. The reflection spectrum of the electrically conductive element with micro-nanostructures is illustrated in two different polarization directions. A first curve 103 was recorded along a first polarization direction "TE", and a second curve 104 was recorded along a second polarization direction "TM".

FIG. 1 thus shows a spectrum for two different light polarization directions. The reflectivity was measured as a function of the light wavelength. FIG. 1 shows absorption at specific wavelengths, as can be seen from dips in the reflection spectrum. Different spectra can be recorded depending on the size and material of the small balls, thus making it possible to predetermine characteristics that are desirable according to the invention (color, characteristic of the reflection spectrum) by varying the size and material of the small balls.

Figure 2:
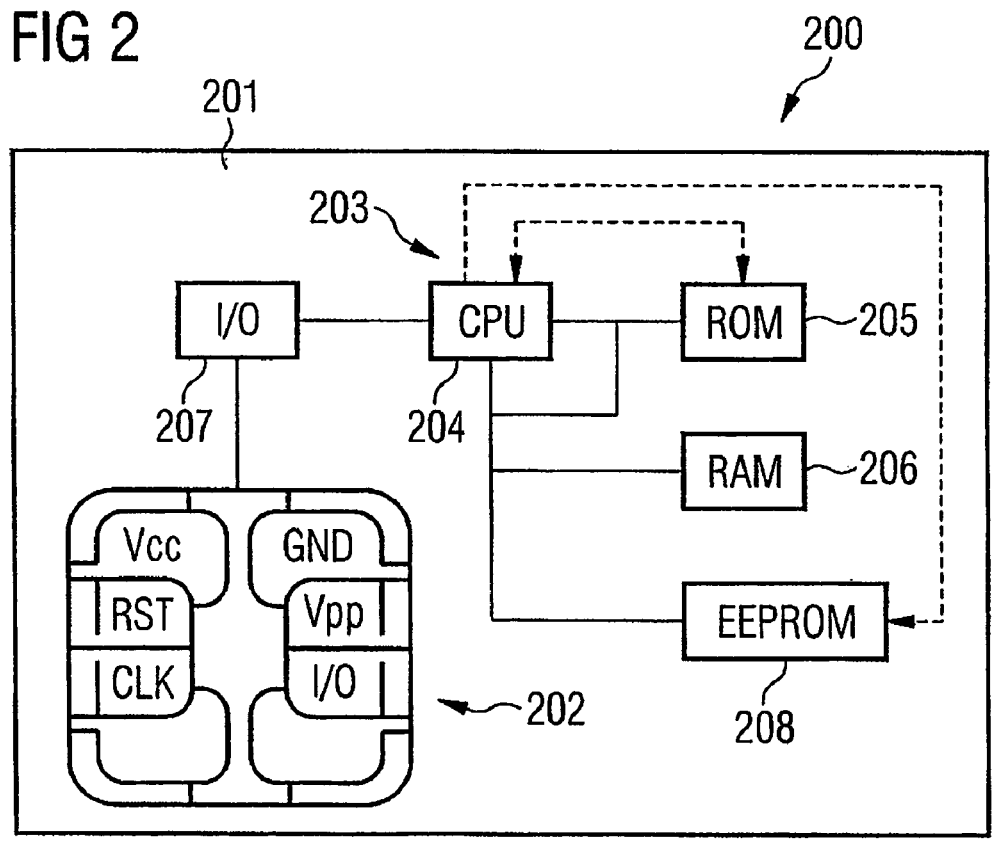
FIG. 2 shows a plan view of a smart card according to one exemplary embodiment of the invention.

The following text describes a smart card 200 according to one exemplary embodiment of the invention, with reference to FIG. 2.

The smart card 200 contains a plastic support 201, with an electrically conductive contact-making element 202 being formed in a surface area of the plastic support 201. Furthermore, an integrated electrical circuit 203 is integrated in the plastic support 201, and is coupled to the electrically conductive contact-making element 202. Electrically conductive microstructures (which are not shown in FIG. 2) are incorporated in the electrically conductive contact-making element 202, specifically a large number of cavities, which are arranged alongside one another and have a diameter of 200 nanometers, which absorb light illuminating them at specific wavelengths (that is to say electromagnetic radiation only in the visible range). This leads to the dips or signal minima in the graph 100.

The electrically conductive contact-making element 202 contains a number of area elements which are electrically decoupled from one another, and these are annotated VCC, GND, RST, VPP, CLK and I/O in FIG. 2. VCC is the connection for a supply voltage, RST is the connection for a reset signal, CLK is the connection for a clock signal, GND is the ground connection, VPP is the connection for a programming voltage, and I/O forms a connection as a data input/data output.

A voltage of 5V is applied to the smart card 200 as the supply voltage VCC. The connection RST is used for application of a start signal for communication. A clock for the smart card processor is supplied from the outside via the connection CLK, with the clock frequency according to the described exemplary embodiment being 7.5 MHz. The programming voltage which is applied to the connection VPP is, according to the described exemplary embodiment, 12.5V. Bi-directional data transmission takes place via the input/output connection I/O for the actual interchange of useful information with the smart card.

The integrated circuit 202 contains a microprocessor 204, a read only memory 205 with an operating system, an EEPROM 208 as the application memory device, a random access memory 206 as a temporary storage medium, and an input/output unit 207. The microprocessor 204, the read only memory 205, the random access memory 206 and the EEPROM 208 are coupled to one another by means of an internal bus system. Data can be interchanged between the input/output unit 207, the microprocessor 204 and the EEPROM 208. Furthermore, data can be interchanged between the microprocessor 204 and the EEPROM 208.

Since the electrically conductive contact-making element is, according to the invention, provided with micro-nano-structures, this results in a colored electrically conductive contact-making element 202. Furthermore, the optical reflection spectrum 100 from FIG. 1 can be scanned by scanning the surface of the electrically conductive contact-making element 202, thus checking the correctness of the smart card 200.

An electrically conductive contact-making element 300 according to a first exemplary embodiment of the invention will be described in the following text with reference to FIG. 3.

FIG. 3 shows a cross-section view of the electrically conductive contact-making element 300, which has a gold body 301. Small latex balls 302 are applied as micro-nanocavities to the gold body 301, and are formed from dielectric material. A gold covering layer 303 with a thickness of 10 nanometers is provided above the small latex balls 302. When illuminated with electromagnetic radiation on an upper surface (shown in FIG. 3) of the electrically conductive contact-making element 300, resonances (surface plasmons) can be excited at characteristic wavelengths in the gold matrix owing to the presence of the small latex balls 302. This leads to characteristic dips in the reflection spectrum, which can be used as a security feature and which give the electrically conductive contact-making element 300 a characteristic color.

An electrically conductive contact-making element 400 according to a second exemplary embodiment of the invention will be described in the following text with reference to FIG. 4.

Small gold balls 401 with a diameter of 500 nanometers are formed on a gold body 301 in the electrically conductive contact-making element 400, a cross-section view of which is shown in FIG. 4. An ITO covering layer (Indium tin oxide) 402 with a thickness d is applied to the small gold balls 401.

When illuminated with electromagnetic waves at a suitable frequency on the upper surface (as shown in FIG. 4) of the electrically conductive contact-making element 400, the light passes through the transparent electrically conductive ITO layer 402 to the small gold balls 401, in which plasmons are excited, thus leading to characteristic dips in the reflection spectrum 100 (see FIG. 1). This means that the correctness of the electrically conductive contact-making element 400 and/or of a smart card to which the electrically conductive contact-making element 400 is applied can be verified by scanning the reflection spectrum of the electrically conductive contact-making element 400. Furthermore, this reflection spectrum gives the electrically conductive contact-making element 400 a characteristic color.

The invention claimed is:

1. A smart card comprising:
   a support element;
   at least one electrically conductive contact-making element in a surface area of the support element; and
   at least one electrical circuit, which is on and/or in the support element and is coupled to the at least one electrically conductive contact-making element;
   wherein microstructures and/or nanostructures are incorporated in the at least one electrically conductive contact-making element, of such a size that the microstructures and/or nanostructures absorb electromagnetic radiation at at least one wavelength.

2. The smart card as claimed in claim 1, wherein the microstructures and/or nanostructures comprise an electrically conductive layer with microcavities and/or nanocavities incorporated therein.

3. The smart card as claimed in claim 2, wherein the microcavities and/or nanocavities are formed close to the surface in the electrically conductive layer.

4. The smart card as claimed in claim 2, wherein the microcavities and/or nanocavities are filled with dielectric material.

5. The smart card as claimed in claim 1, wherein the microstructures and/or nanostructures comprise a layer having of electrically conductive microbodies and/or nanobodies.

6. The smart card as claimed in claim 5, further comprising an electrically conductive thin layer on the layer having microbodies and/or nanobodies.

7. The smart card as claimed in claim 6, wherein the electrically conductive thin layer is formed using at least one material selected from the group consisting of indium tin oxide, silver, gold, copper, platinum, and silicon.

8. The smart card as claimed in claim 1, wherein the microstructures and/or nanostructures have a dimension in a range from nanometers to micrometers.

9. The smart card as claimed in claim 1, wherein the microstructures and/or nanostructures have a dimension in a range from 10 nanometers to 1 micrometer.

10. The smart card as claimed in claim 1, wherein the microstructures and/or nanostructures are arranged consitently.

11. The smart card as claimed in claim 1, wherein the microstructures and/or nanostructures are formed using a metal and/or a semiconductor.

12. The smart card as claimed in claim 1, wherein the microstructures and/or nanostructures are formed using silver, gold, platinum, and/or silicon.

13. The smart card as claimed in claim 1, wherein the microstructures and/or nanostructures are dimensioned such that they absorb electromagnetic radiation in the visible range and/or in the infrared range.

14. The smart card as claimed in claim 1, wherein the microstructures and/or nanostructures are dimensioned and arranged such that they produce a visually perceptible image in a presence of electromagnetic radiation in the visible range.

15. The smart card as claimed in claim 1, wherein the microstructures and/or nanostructures are dimensioned and arranged such that they have at least one visually perceptible color in a presence of electromagnetic radiation in the visible range.

16. A method for producing a smart card, comprising the steps of:
forming at least one electrically conductive contact-making element in a surface area of a support element;
forming at least one electrical circuit on and/or in the support element and coupling the at least one electrical circuit to the at least one electrically conductive contact-making element; and
incorporating microstructures and/or nanostructures in the at least one electrically conductive contact-making element, of such a size that the microstructures and/or nanostructures absorb electromagnetic radiation at at least one wavelength.

17. The method as claimed in claim 16, wherein the microstructures and/or nanostructures comprise an electrically conductive layer with microcavities and/or nanocavities incorporated therein.

18. The method as claimed in claim 17, wherein the microcavities and/or nanocavities comprise dielectric microstructures and/or nanostructures covered with electrically conductive material.

19. The method as claimed in claim 16, wherein the step of incorporating the microstructures and/or nanostructures includes the step of depositing a layer composed of electrically conductive microbodies.

20. A smart card comprising:
a support element;
at least one electrically conductive contact-making means in a surface area of the support element; and
at least one electrical circuit, which is on and/or in the support element and is coupled to the at least one electrically conductive contact-making means;
wherein microstructures and/or nanostructures are incorporated in the at least one electrically conductive contact-making means, of such a size that the microstructures and/or nanostructures absorb electromagnetic radiation at at least one wavelength.

21. A method for producing a smart card, comprising the steps of:
means for forming at least one electrically conductive contact-making element in a surface area of a support element;
means for forming at least one electrical circuit on and/or in the support element and coupling the at least one electrical circuit to the at least one electrically conductive contact-making element; and
means for incorporating microstructures and/or nanostructures in the at least one electrically conductive contact-making element, of such a size that the microstructures and/or nanostructures absorb electromagnetic radiation at at least one wavelength.

22. The method as claimed in claim 21, wherein the means for incorporating includes a means for depositing a layer composed of electrically conductive microbodies.

* * * * *

UNITED STATES PATENT AND TRADEMARK OFFICE
CERTIFICATE OF CORRECTION

PATENT NO.       : 7,213,769 B2                                    Page 1 of 1
APPLICATION NO.  : 11/121689
DATED            : May 8, 2007
INVENTOR(S)      : Bernhard T. Knoll It is certified that error appears in the above-identified patent and that said Letters Patent is hereby corrected as shown below:

In the Claims:

Col. 9, Line 25
In Claim 10, "consitently" should read --consistently--

Signed and Sealed this

Tenth Day of July, 2007

JON W. DUDAS
*Director of the United States Patent and Trademark Office*